United States Patent
Sobel et al.

(10) Patent No.: US 8,228,371 B2
(45) Date of Patent: Jul. 24, 2012

(54) PROJECTION SCREEN AND CAMERA ARRAY

(75) Inventors: Irwin Sobel, Palo Alto, CA (US); Bruce Culbertson, Palo Alto, CA (US); Dan Gelb, Palo Alto, CA (US); Michael Harville, Palo Alto, CA (US); Henry Harlyn Baker, Palo Alto, CA (US); Andrew Fitzhugh, Palo Alto, CA (US); Donald Ovila Tanguay, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1501 days.

(21) Appl. No.: 11/496,805

(22) Filed: Jul. 31, 2006

(65) Prior Publication Data

US 2008/0043100 A1    Feb. 21, 2008

(51) Int. Cl.
*H04N 13/02*    (2006.01)
*G03B 21/56*    (2006.01)

(52) U.S. Cl. ............. 348/47; 348/14.08; 359/448
(58) Field of Classification Search . 375/240.01–240.29
See application file for complete search history.

(56) References Cited

U.S. PATENT DOCUMENTS

| 5,959,667 A * | 9/1999 | Maeng ............... 348/211.99 |
| 6,554,433 B1 * | 4/2003 | Holler .................... 353/79 |
| 2002/0063780 A1 * | 5/2002 | Harman et al. ......... 348/211 |
| 2003/0197779 A1 * | 10/2003 | Zhang et al. ........ 348/14.16 |
| 2004/0183749 A1 * | 9/2004 | Vertegaal ................. 345/7 |
| 2006/0274411 A1 * | 12/2006 | Yamauchi ............... 359/443 |
| 2007/0002130 A1 * | 1/2007 | Hartkop ............. 348/14.16 |

* cited by examiner

Primary Examiner — Mehrdad Dastouri
Assistant Examiner — James Anderson, II

(57) ABSTRACT

One embodiment in accordance with the invention is a video system that can include a display screen and a plurality of video capturing devices located behind the display screen. It is noted that each of the plurality of video capturing devices is for capturing a video stream through the display screen.

15 Claims, 10 Drawing Sheets

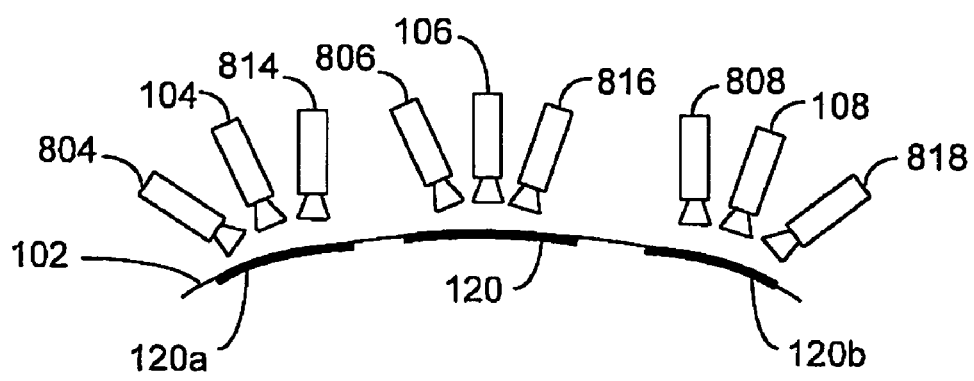
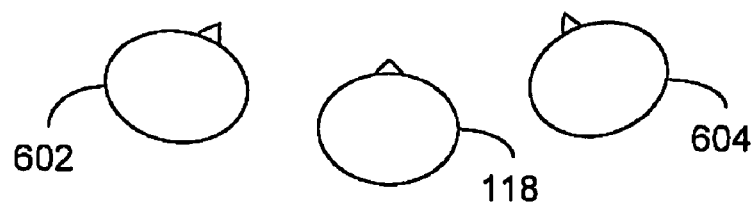
Fig. 8

PROJECTION SCREEN AND CAMERA ARRAY

CROSS REFERENCE TO RELATED APPLICATIONS

This application is related to co-pending patent application, Ser. No. 11/491,360, entitled "See Through Display" by Huei Pei Kuo et al., filed Jul. 21, 2006, and assigned to the assignee of the present invention.

BACKGROUND

Video conferencing is an established method of collaboration between remotely located participants. A video image of a remote environment is broadcast onto a local display allowing one or more participants at a local site to see and talk to one or more remotely located participants.

Some video conferencing applications seek to provide physically realistic eye contact between participants at remote sites. This can be referred to as "person-accurate" eye contact, "personalized" eye contact, consistent gaze, or correct gaze. However, it is currently difficult to place video cameras in a video conference situation at locations needed to achieve proper eye-contact, namely at or very near the eyes of each displayed participant. For example, typically within a video conference between two participants, a video camera at each site is located above a display device (e.g., plasma display) that is viewed by each participant, thereby resulting in a slightly awkward downward viewing angle of the other participant. As such, the correct gaze or proper eye contact between the two participants is not really achieved when employing this technique.

Another conventional two-party video conferencing technique involves the placement of a half-silvered mirror in front of a display screen that is viewed by each participant. For example, at each site, a half-silvered mirror can be positioned at a 45 degree angle and situated between the display screen and its participant. Additionally, a video camera is usually located at each site above the half-silvered mirror such that the principal axis of the camera is aligned with the preferred viewing direction of the display. This causes each participant to be looking into the camera while viewing the display, so that correct gaze can be achieved between the two participants. However, this technique is difficult to extend to systems employing multiple cameras at each site, large display surfaces, curved display surfaces, or combinations of these.

Yet another conventional video conferencing technique for trying to achieve correct gaze between two video conferencing participants involves using a hole within a display screen. For example, at each site, a video camera is positioned behind the display screen and aligned to operate through the hole in the display screen. Note that the hole through the display screen is typically located such that it is not distracting to the participant viewing the images shown on the screen. For instance, the hole may be located in a part of the screen where a black region will be projected onto the screen. However, the problem with this technique is that the proper eye contact or correct gaze between the two participants is not really achieved, since the hole is typically not located where the eyes of the remote participant are displayed. Furthermore, it is often difficult to conceal the hole so that is does not detract significantly from the displayed image.

Therefore, it is desirable to address one or more of the above issues.

BRIEF DESCRIPTION OF THE DRAWINGS

FIG. 8 is yet another exemplary video system in accordance with various embodiments of the invention.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
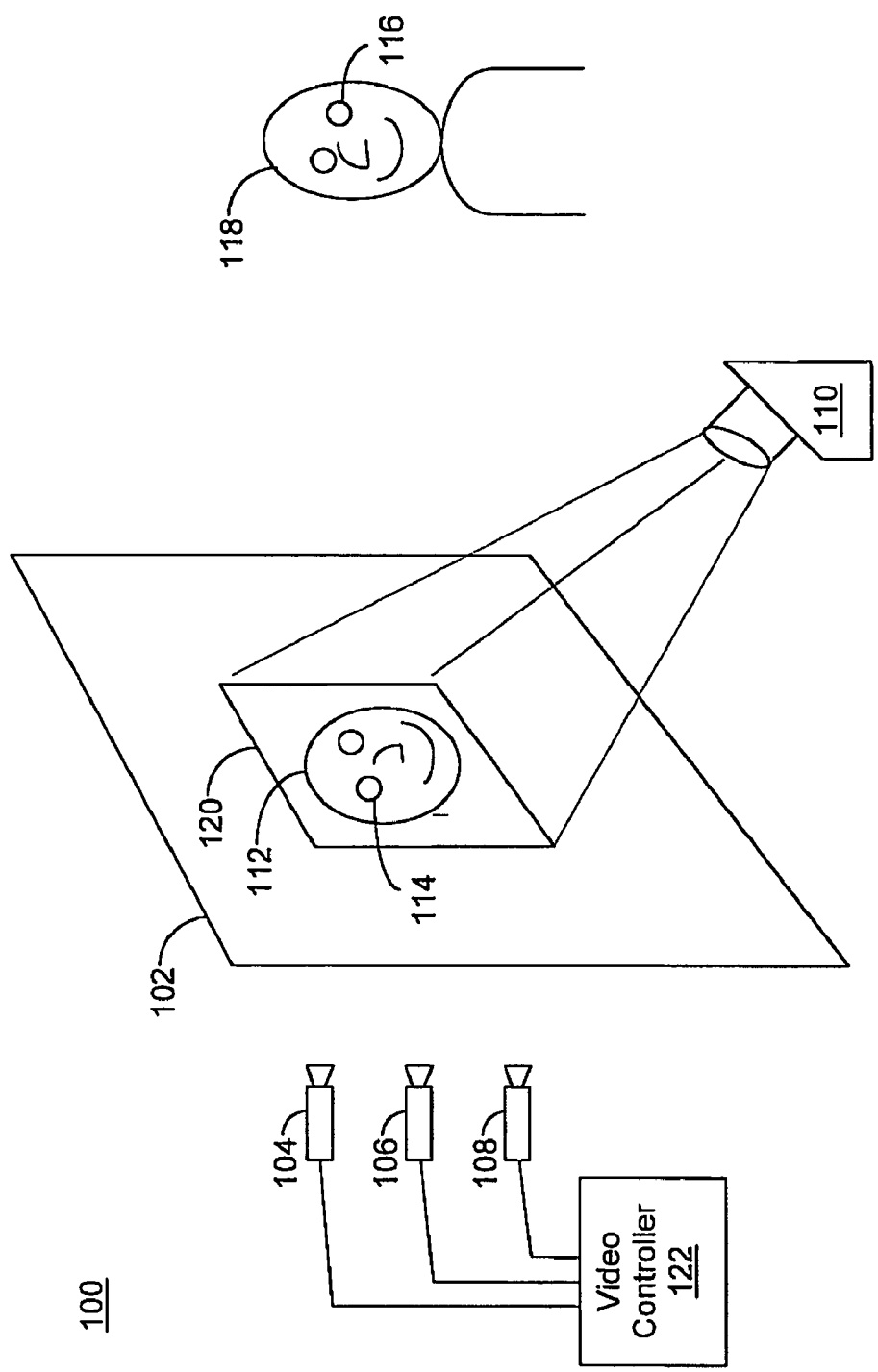
FIG. 1 is an exemplary video system in accordance with various embodiments of the invention.

FIG. 1 is a diagram of a video conferencing and/or remote-collaboration system 100 for establishing proper eye-contact in accordance with various embodiments of the invention. System 100 can involve acquiring video streams of participants (e.g., 118) in a teleconferencing and/or remote-collaboration situation with a front-projection display system by utilizing a see-through screen 102 with video cameras 104, 106 and 108 placed behind it. It is understood that images (or a video stream) 120 of at least one remote participant 112 can be displayed on the front-projection see-through screen 102 by a projector (or view generator) 110. It is noted that in order to achieve proper eye contact between the video conferencing participants, the camera (e.g., 106) that is imaging the local participant 118 at each site should be located behind or substantially behind the location where the eyes 114 of the remote participant person 112 are displayed on projection screen 102.

Video system 100 can include the see-through display screen 102 along with video capturing devices 104, 106 and 108 (which together can be referred to as a camera array) that can be located behind the see-through display screen 102. For example in various embodiments, the video capturing devices (e.g., video cameras) 104, 106 and 108 can be placed at the most likely or probable locations of where images of people's eyes (e.g., 114) are likely to be displayed or fall on display screen 102. In various embodiments, each of the video capturing devices 104, 106 and 108 can be located at a different position (e.g., horizontal and/or vertical) in relation to the projection screen 102. As such, proper eye-contact or consistent gaze between a local participant 118 and a remote participant 112 during a video conferencing or teleconferencing situation can be achieved by selecting or choosing the video capturing device (e.g., 106) that is located closest to where the eyes 114 of the image 120 are shown on the see-through screen 102. It is noted that the selecting or choosing of the appropriate video capturing device or camera can occur separately at each participant's location. It is noted that the selecting or choosing of the appropriate video capturing device or camera can occur separately at each participant's location, and that this selection is possible once the relative placement and orientation of those cameras and displays are determined. Determining those relationships is a process of calibration.

Within FIG. 1, at each site or location of the video conference, once the remote participant 112 is displayed upon the see-through display screen 102, a determination can be made as to which one of cameras 104, 106 and 108 is located nearest the displayed eyes 114 of remote participant 112. Once the nearest or closest camera (e.g., 106) has been determined, that camera can then be selected so that it can begin capturing video images (or a video stream) of the local participant 118, which can subsequently be transmitted for viewing by the remote participant 112. It is understood that the determination and selection of the closest camera to the displayed eyes 114 can be implemented manually or automatically. For example in various embodiments, the manual camera selection can include someone utilizing a cursor control device (e.g., a computer mouse). In various embodiments, the automatic camera selection can involve tracking the location of eyes 114 of the remote user image within video stream 120. It is understood that if this arrangement holds for both ends of the video conferencing and/or remote-collaboration link, then mutual eye-contact can be established between the eyes 114 of participant 112 and the eyes 116 of participant 118.

As part of system 100, the video capturing devices 104, 106 and 108 can be arranged in a wide variety of ways behind the see-through display screen 102. For example in various embodiments, if one or more local participants (e.g., 118) are going to be sitting during the teleconference, video capturing devices 104, 106 and 108 can be positioned behind the see-through display screen 102 in order to accommodate different eye levels of a sitting person. In various embodiments, if one or more local participants (e.g., 118) are going to be seen above or below others during the video conference, video capturing devices 104, 106 and 108 can be positioned behind the see-through display screen 102 in order to accommodate different eye levels.

Within FIG. 1, the see-through projection screen 102 can include, but is not limited to, the following characteristics: a high contrast at ambient light levels for normal work environments; and being transparent enough to supply high quality images to the video capturing devices 104, 106 and 108 located behind it. For example in various embodiments, the high contrast characteristic of the projection screen 102 can be implemented by having it include a bi-reflective screen surface, and arranging the projected image light 120 to come from a different direction than the ambient room light, e.g., ambient lighting from ceiling lights, and one or more projectors 110 on the floor under a desk or table (not shown). It is appreciated that see-through projection screen 102 can be implemented in a wide variety of ways. For example in various embodiments, the see-through projection screen 102 can be, but is not limited to, a substantially planar surface, a curved surface, a non-planar surface, a cylinder shape, a closed loop shape, any type of shape, or any type of surface.

In various embodiments, multiple projectors are used to create a single, seamless display on see-through projection screen 102, using multi-projector tiling and blending techniques. Many methods for combining multiple, partially overlapping projectors into a unified display are known in the art. These methods typically modify the projected imagery prior to display so that image sub-sections projected by different projectors are aligned, distortions imposed by the screen surface and projector lenses are corrected, projected image brightness is attenuated where multiple projectors overlap, and brightness and color gamut varies smoothly across the spatial extent of the tiled display. The methods often employ video capture devices observing the screen as measuring devices to determine what modifications need to be made to imagery prior to projection in order to achieve a seamless tiled projection display.

It is understood that in various embodiments, each of the video capturing devices 104, 106 and 108 can be implemented with a shade in order to shield its video capturing device from capturing illumination output by projector 110. Furthermore, one or more of the video capturing devices 104, 106 and 108 can be implemented with a shade.

Within FIG. 1, it is noted that the elements of system 100 are not limited to use during video conferencing and/or remote collaboration. That is, different combinations of the elements of system 100 can be utilized in a wide variety of ways. For example in various embodiments, the see-through screen 102, projector 110, and the video capturing devices 104, 106 and 108 can be utilized for, but are not limited to, clandestine observations from multiple viewpoints, games, interactive games, gaze tracking, imaging people that pass by and/or view the projection screen 102, and the like.

Furthermore, in various embodiments, the see-through screen 102, projector 110, and the video capturing devices 104, 106 and 108 can be utilized for, but are not limited to, creating a new video stream via "view synthesis". Specifically, the video capturing devices 104, 106 and 108 can be located at different positions in relation to the projection screen 102 and can capture overlapping video images through the projection screen 102. From the captured overlapping video images, a synthetic video image or stream can be created of one or more objects that was included with the captured overlapping video images. More specifically, a new video stream representing the view from a non-existent video capture device can be created by the video controller 122 from two or more video streams that can be captured through the projection screen 102 by two or more video capture devices (e.g., 104, 106 and 108). In various embodiments, the view synthesis techniques used to create this new video stream comprise multi-camera three-dimensional reconstruction of a model of the viewed scene using two or more of the video capture devices 104, 106 and 108, followed by rendering of a two-dimensional image of the appearance of this three-dimensional model when viewed from a selected direction, where the selected direction typically does not correspond to one of the video capture devices. Many multi-camera three-dimensional reconstruction techniques are well known in the art. In other embodiments, view synthesis of a new video stream is accomplished without full three-dimensional reconstruction, via any of several methods well known in the art. Some view synthesis methods that omit three-dimensional reconstruction instead rely on two-dimensional image warping or morphing between two or more corresponding images captured by video capture devices 104, 106, and 108, where the warping or morphing is guided by image feature location correspondences that have been established between images captured at the same time by different video capture devices.

Within video system 100, it is noted that each of video capturing devices 104, 106 and 108 is coupled to a video controller system 122. Note that the video controller 122 can perform a wide variety of functions. For example in various embodiments, the video controller 122 can determine, select and/or activate which one of the video capturing devices 104, 106 and 108 is located closest to where the eyes 114 of the image 120 are shown on the see-through display screen 102. Furthermore, in various embodiments, the video controller 122 can receive, record, and/or transmit the captured video streams output by each of the video capturing devices 104, 106 and 108. Moreover, in various embodiments, the video controller 122 can perform operations associated with the different utilizations for the elements of system 100, described herein. It is appreciated that the video controller 122 can be implemented as a computing device, but is not limited to such.

Within FIG. 1, it is understood that in various embodiments, the video system 100 can include more or less video capturing devices than the three shown (e.g., video capturing devices 104, 106 and 108). In various embodiments, the video system 100 can include at least two video capturing devices (e.g., 104 and 106), but is not limited to such.

Figure 2:
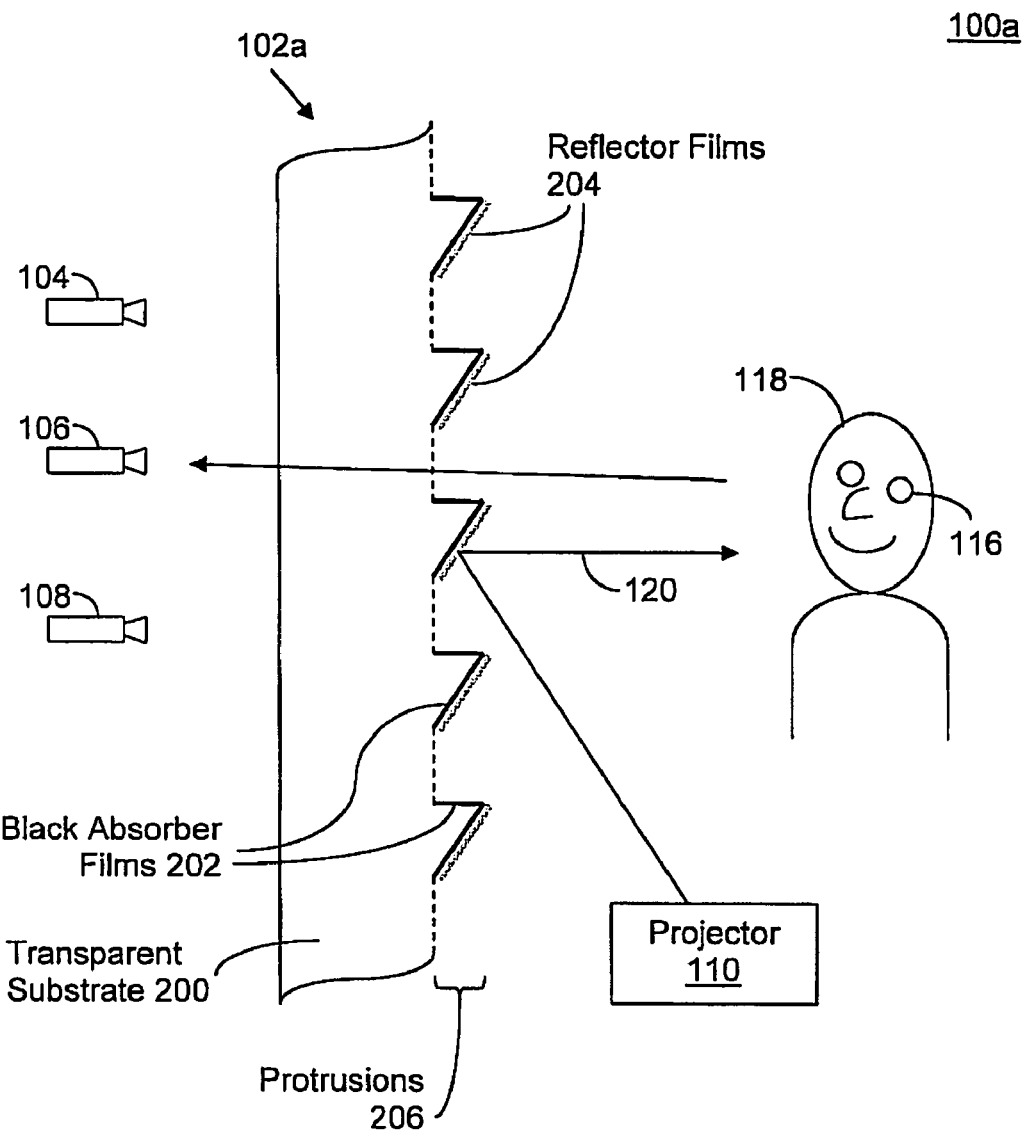
FIG. 2 is another exemplary video system in accordance with various embodiments of the invention.

FIG. 2 is an exemplary video conferencing system 100a that includes an exemplary bi-reflective display screen 102a in accordance with various embodiments of the invention. Note that FIG. 2 includes a side-sectional view of display screen 102a. The display screen 102a can be implemented utilizing a macroscopically homogenous see-through screen material 200, which can also be referred to as a transparent substrate. Additionally, the transparent substrate 200 includes multiple triangular shaped protrusions 206 that each has deposed thereon a black absorber film 202 (e.g., chromium oxide ($CrO_2$)). Furthermore, a portion of each of the black absorber film 202 has disposed thereon a reflector film 204 (e.g., aluminum), which provides a reflective surface for reflecting the video stream 120 output by projector 110. Moreover, each of the video capturing devices 104, 106 and 108 is able to capture video images of the local participant 118 through the see-through display screen 102a.

Specifically, the see-through projection screen 102a can include transparent sections (indicated by dashed lines) that are located between the protrusions 206, thereby enabling illumination to pass through projection screen 102a. As such, the image capturing devices 104, 106 and 108 are each able to capture images (or a video stream) of the local participant 118 through the see-through projection screen 102a. Furthermore, at least one projector 110 can output the video stream 120 towards the reflector films 204 such that the video stream 102 will be reflected towards the local participant 118 and be viewable. It is noted that the contrast of the projection screen 102a is improved because it includes the black absorber films 202, which absorb ambient light and decrease glare.

Figure 3:
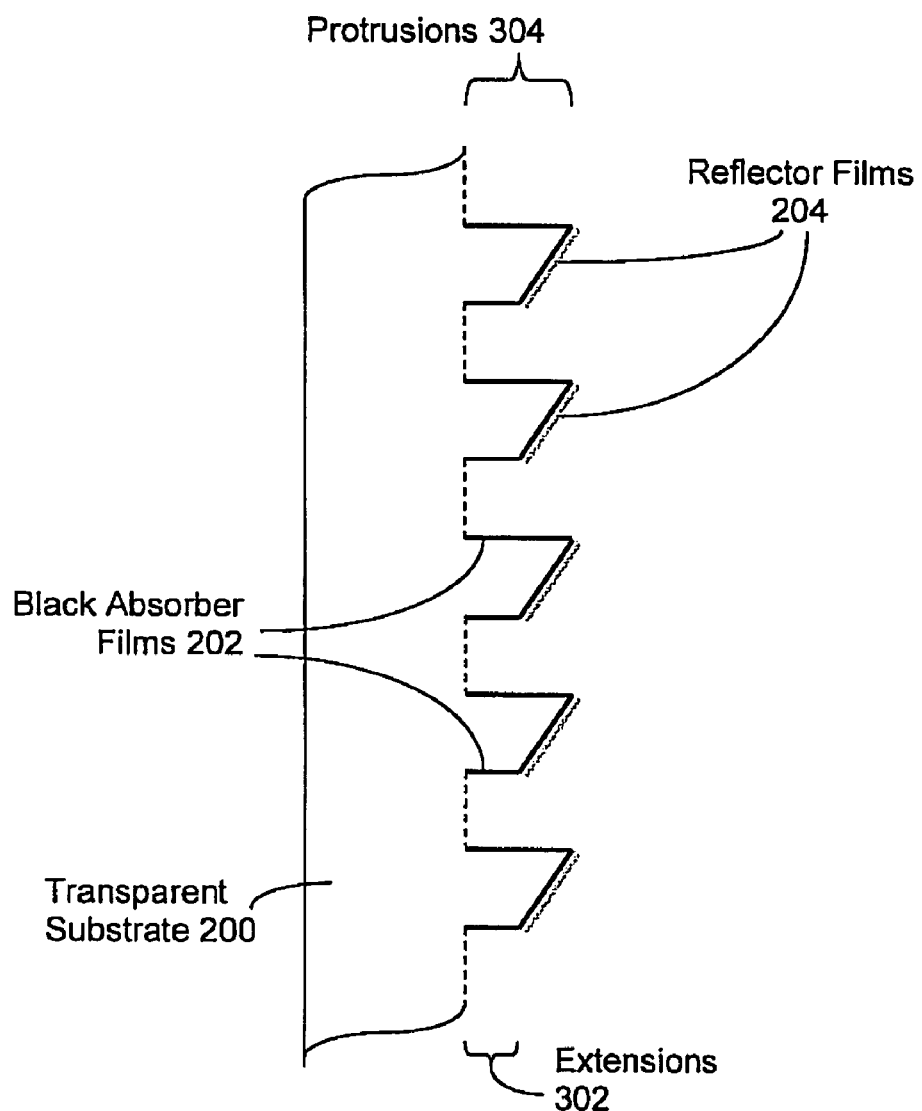
FIG. 3 is an exemplary display screen in accordance with various embodiments of the invention.

FIG. 3 is a diagram of a side-sectional view of an exemplary see-through display screen 1021b in accordance with various embodiments of the invention. It is noted that display screen 1021b of FIG. 3 is similar to the display screen 102a of FIG. 2. However, the protrusions 304 of display screen 1021b of FIG. 3 are shaped differently than the triangular shaped protrusions 206 of display screen 102a of FIG. 2. Specifically, each of the protrusions 304 of display screen 1021b includes a lower horizontal extension portion 302, upon which the black absorber film 202 can be disposed. When the display screen 1021b is implemented in this manner, it can provide more ambient light absorption than display screen 102a.

Figure 4:
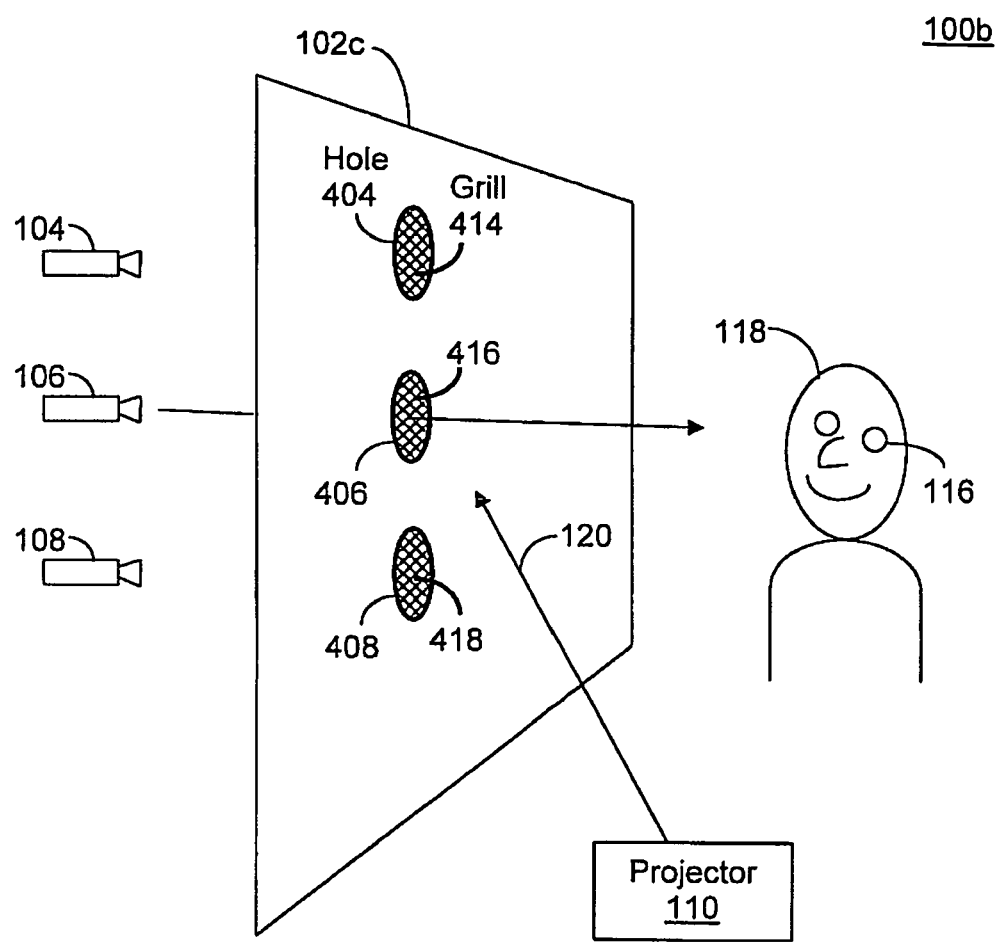
FIG. 4 is yet another exemplary video system in accordance with various embodiments of the invention.

FIG. 4 is an exemplary video conference system 100b that can include a display or projection screen 102c that defines at least one hole (e.g., 404, 406 and 408) in accordance with various embodiments of the invention. It is understood that the projector 110 and the video capturing devices 104, 106 and 108 of video system 100b (FIG. 4) can operate in the same manner as they do within video system 100 of FIG. 1. However, the differences substantially involve projection screen 102c.

Specifically, the projection display screen 102c of FIG. 4 can define (or include) holes or opening 404, 406 and 408. As such, video capturing devices 104, 106 and 108 can be aligned with the holes 404, 406 and 408, respectively, to enable each of the video capturing devices 104, 106 and 108 to have the ability to capture video images (or a video stream) through projection screen 102c. Furthermore, the holes 404, 406 and 408 of projection screen 102c can be covered by mesh or perforated coverings 414, 416 and 418, respectively, that partially cover their respective holes while being transparent enough to supply high quality images to the video capturing devices 104, 106 and 108 located behind projection screen 102c.

Within FIG. 4, it is understood that the mesh coverings 414, 416 and 418 can be implemented in a wide variety of ways. For example in various embodiments, each of the mesh coverings 414, 416 and 418 can include a material that is similar to that of the projection screen 102b. However, each of the mesh coverings 414, 416 and 418 can include a multitude of small perforations in the material, thereby causing it to be see-through. Furthermore, if the projection screen 102c includes a gray opaque screen surface, its gray level can be adjusted so that it matches the perforated average gray of each of the see-through mesh coverings 414, 416 and 418 when viewed from the location of the user or participant (e.g., 118). In various embodiments, the color of the mesh covering material can be selected such that its average gray level after perforation matches the gray level of the opaque screen 102c in which it covers a hole.

In various embodiments, each of the mesh coverings 414, 416 and 418 can be implemented with a perforated plastic mesh (or screen or grill) that is a similar color as the projection screen 102c. For example, if the projection screen 102c includes a gray opaque-screen surface, its gray-value can be adjusted so that it matches the perforated average gray of each of the see-through perforated plastic mesh coverings 414, 416 and 418 when viewed from the location of the user or participant (e.g., 118).

Within FIG. 4, it is noted that if each of the see-through mesh coverings 414, 416 and 418 includes coarse perforations, the effective attenuation mask of the perforations can be measured and used to compensate for resulting spatial non-uniformity of the image luminance. It is pointed out that this can be performed by the video controller 122 (e.g., of FIG. 1).

It is understood that if a hole defined by display screen 102c and its corresponding mesh covering are large enough, one or more of the video capturing devices 104, 106 and 108 can use the single hole to capture video images (or a video stream) through the display screen 102c. Please note that video system 100b can be implemented in any manner similar to that described herein, but is not limited to such.

Figure 5:
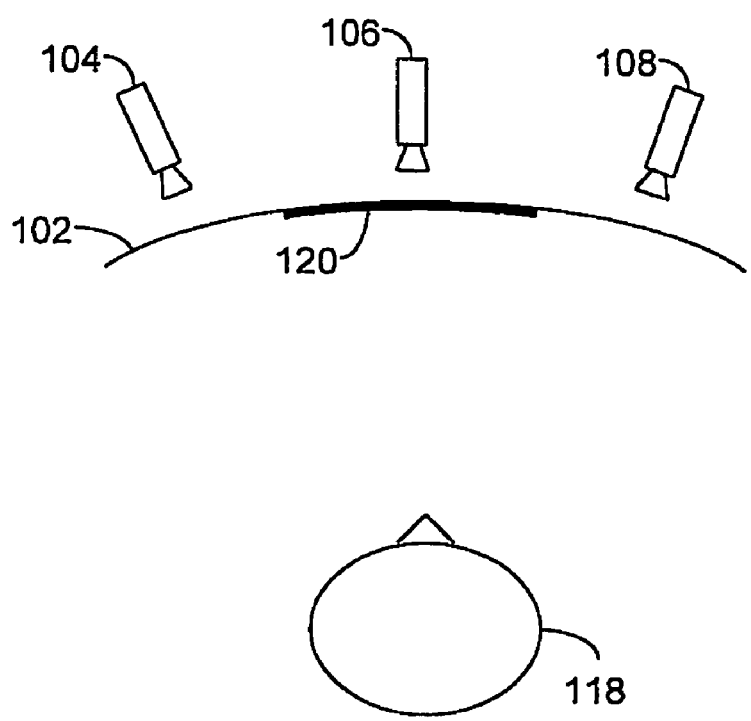
FIG. 5 is still another exemplary video system in accordance with various embodiments of the invention.

FIG. 5 is a top view of an exemplary video conferencing system 500 for three-dimensional reconstruction in accordance with various embodiments of the invention. Specifically, multiple video capturing devices (e.g., 104, 106 and 108) can be located behind the see-through projection display 102. Note that the similarly numbered elements can operate in a similar manner as described herein. It is noted that within video system 500, the video capturing devices 104, 106 and 108 can all operate simultaneously to capture different viewpoint video images (or video streams) of the local participant 118 through display screen 102. The different video images or video streams output by the video capturing devices 104, 106 and 108 can then be utilized (e.g., by video controller 122) to do view synthesis of participant 118.

Figure 6:
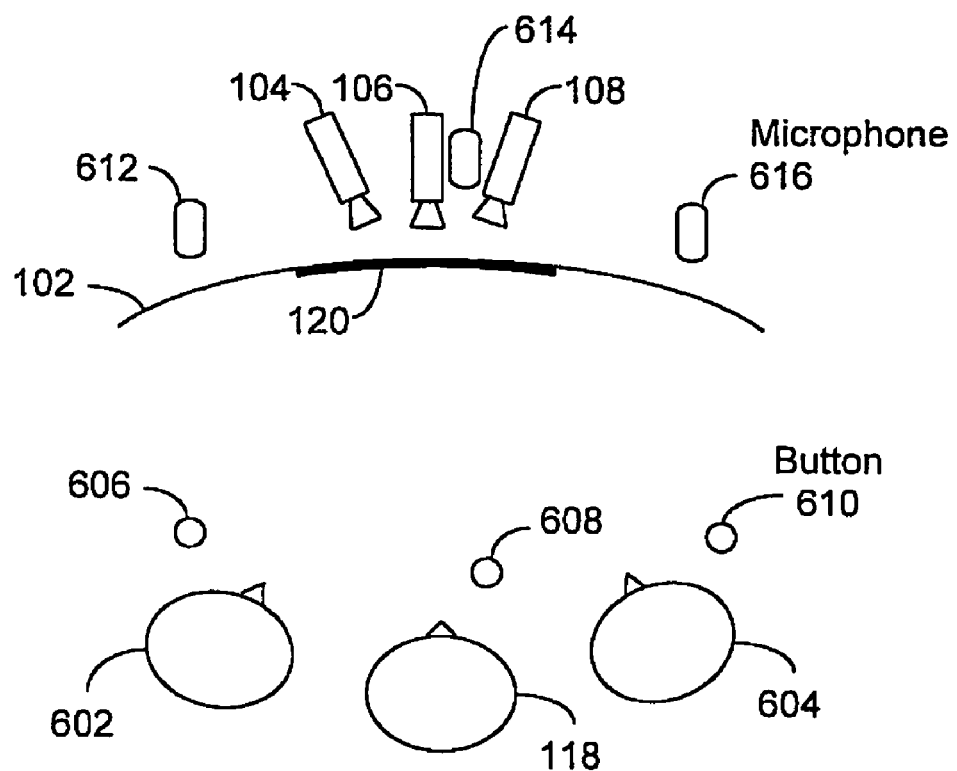
FIG. 6 is another exemplary video system in accordance with various embodiments of the invention.

FIG. 6 is a top view of an exemplary video conferencing system 600 in accordance with various embodiments of the invention. Specifically, when two people are having a conversation (e.g., local participant 118 and remote participant 112 (shown in FIG. 1) of video steam 120) within video system 600, they can be referred to as "having the floor". Within video system 600, the people who have the floor may be provided the proper eye-contact or correct gaze. As such, when new people have the floor, it is desirable for video system 600 to adjust itself to provide proper eye contact or correct gaze for those people.

For example, if the local participant 118 and the remote participant 112 of the video stream 120 have the floor, then the video capturing device 106 can be activated, thereby providing the remote participant 112 the proper viewpoint and eye-contact with the local participant 118. However, the floor changes when local participant 602 begins speaking with remote participant 112. As such, the video capturing device 106 can be deactivated while video capturing device 108 can be activated, thereby providing the remote participant 112 the proper viewpoint and eye-contact with the local participant 602. Similarly, the floor changes when local participant 604 begins speaking with remote participant 112. Therefore, the video capturing device 108 can be deactivated while video capturing device 104 can be activated, thereby providing the remote participant 112 the proper viewpoint and eye-contact with the local participant 604.

Within video system 600 of FIG. 6, there are a wide variety of ways to determine who has the floor. For example in various embodiments, one or more manual mechanisms can be utilized to establish who has the floor. The one or more manual mechanisms can be implemented in a wide variety of ways. For instance in various embodiments, the one or more manual mechanisms can each be implemented as a switch or a button (e.g., 606, 608 or 610). As such, when local participant 602 wants to have the floor, participant 602 can push button 606 at the appropriate time, thereby causing the activation of video capturing device 108 and the deactivation of the previous video capturing device (if any). Likewise, local participant 118 can push button 608 when the floor is desired while local participant 604 can push button 610 when the floor is desired.

It is noted that in various embodiments, one or more automatic mechanisms can be utilized to establish who has the floor. The one or more automatic mechanisms can be implemented in a wide variety of ways. For instance in various embodiments, the one or more automatic mechanisms can include an audio tracking system (e.g., that can be included within video controller 122) coupled with audio listening devices (e.g., microphones) 612, 614 or 616. As such, when local participant 602 begins speaking, the audio tracking system can utilize audio received by the audio listening devices 612, 614 and 616 to determine that participant 602 is speaking, thereby causing the activation of video capturing device 108 and the deactivation of the previous video capturing device (if any). Likewise, when either of the local participants 118 or 604 speaks, the audio tracking system can utilize audio received by the audio listening devices 612, 614 and 616 to determine which participant has the floor.

Within FIG. 6, it is pointed out that in various embodiments, the one or more automatic mechanisms can include a gaze tracking system (e.g., that can be included within video controller 122) coupled with video capturing devices 104, 106 and 108. As such, when local participant 602 begins speaking, the audio tracking system can utilize video images or video streams received by the video capturing devices 104, 106 and 108 to determine that participant 602 has the floor since the eyes of the other local participants 118 and 604 began looking at participant 602. As a result, this can cause the activation of video capturing device 108 as the active feed received by the remote participant 112 and the deactivation of the previous video capturing device (if any) as the active feed. Likewise, the audio tracking system and the video capturing devices 104, 106 and 108 can operate in a similar manner for each of the local participants 118 and 604. However, the video capturing device 106 can be activated as the active feed when local participant 118 has the floor while the video capturing device 104 can be activated as the active feed when local participant 604 has the floor.

It is noted that within video system 600, any combination of the mechanisms described above can be utilized to establish or determine who has the floor. Within video system 600, it is understood that the video capturing devices 104, 106 and 108 do not have to remain fixed. Instead, in various embodiments, each of the video capturing devices 104, 106 and 108 could be implemented to include mechanical panning and tilting for providing the remote participant 112 the proper viewpoint and eye-contact with the appropriate local participant that has the floor. As such, fewer video capturing devices could be used within video system 600. It is understood that within video system 600, in various embodiments, the video capturing devices 104, 106 and 108 can be substituted with a multi-optic panorama camera that consists of multiple individual cameras positioned to have approximately the same center of projection, and that mosaics the individual camera video streams into a single, seamless, extended field-of-view video stream. As such, the multi-optic panorama camera can be virtually steered (e.g., by the video controller 122) by selecting the appropriate sub-window in its extended field of view.

Figure 7:
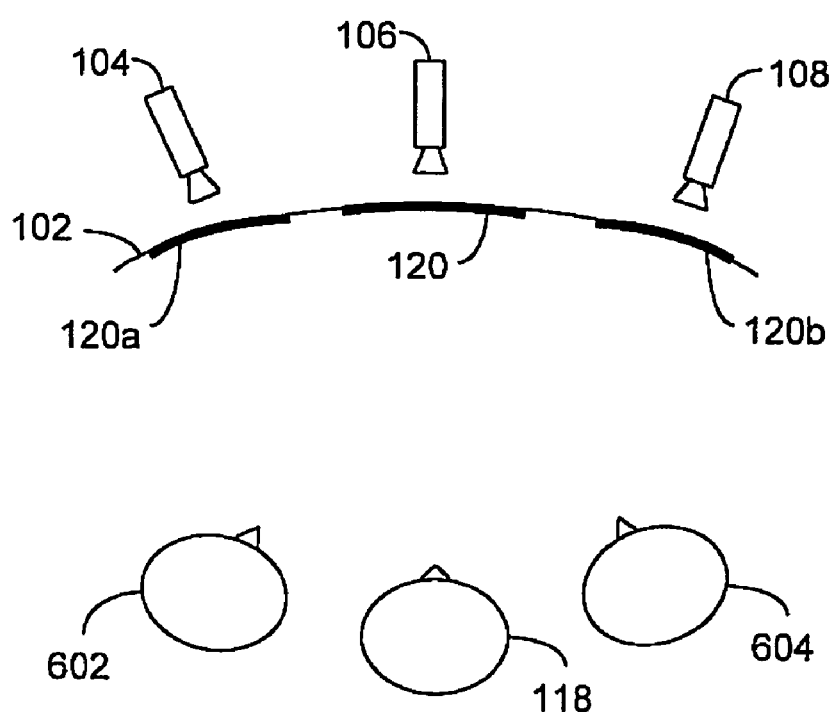
FIG. 7 is still another exemplary video system in accordance with various embodiments of the invention.

FIG. 7 is a top view of an exemplary video conferencing system 700 for multiple remote and local participants in accordance with various embodiments of the invention. Specifically, video system 700 can be used during a video conferencing and/or remote-collaboration and the video capturing devices 104, 106 and 108 can remain fixed. It is understood that the video capturing devices 104, 106 and 108 are located behind (or on a single side of) the see-through projection screen 102 while local participants 118, 602 and 604 are located on the other side (or front) of the projection screen 102.

Within video system 700, it is noted that video streams (or images) 120a, 120b and 120c can be projected onto the see-through screen 102 by one or more projectors (e.g., 110 shown in FIG. 1), wherein each of the video streams 120, 120a and 120b can include a video image of a different remote participant (e.g., similar to 112 shown in FIG. 1). In various embodiments, at least one of the video streams 120, 120a, and 120b can include a video image of more than one remote participant. It is noted that video system 700 will be described with reference to the case of one person per video stream, but it is appreciated that similar implementation can apply when multiple people are present in each video stream.

In various embodiments, each of the video capturing devices 104, 106 and 108 can be located substantially behind the eyes of its corresponding remote participant included within each of the video streams 120, 120*a* and 120*b*. Furthermore, each of the video capturing devices 104, 106 and 108 can be aligned to substantially capture a video stream or images of local participants 118, 602 and 604. In this manner, when one of the remote participants shown in video streams 120, 120*a* and 120*b* has the floor, that remote participant can have proper eye-contact with the local participants 118, 602 and 604 when the corresponding video capturing device is selected and activated. For example, if the remote participant 112 (shown in FIG. 1) of video stream 120 has the floor, the video capturing device 106 can be selected and activated. As such, the video capturing device 106 can capture a video stream through see-through screen 102 of the local participants 118, 602 and 604 viewing the remote participant 112 within displayed video stream 120.

Within FIG. 7, in various embodiments, it is understood that each of the remote participants included within the displayed video streams 120, 120*a* and 120*b* can be physically located at different video conferencing locations, but are not limited to such.

FIG. 8 is a top view of an exemplary video conferencing system 800 for multiple remote and local participants in accordance with various embodiments of the invention. It is noted that video system 800 operates in a manner similar to video system 700 of FIG. 7. However, video system 800 of FIG. 8 can involve view synthesis of local participants 118, 602 and 604 to generate a video stream corresponding to a camera location not occupied by any of the physical cameras (e.g. 104, 106, 108, 804, 814, 806, 816, 808, 818) used by video system 800.

Specifically, when the remote participant 112 (shown in FIG. 1) of the video stream 120 has the floor, the corresponding video capturing devices 106, 806 and 816 can be selected and activated such that they operate simultaneously to capture different viewpoint video images (or video streams) of the local participants 118, 602 and 604 through display screen 102. The different video images or video streams output by the video capturing devices 106, 806 and 816 can then be utilized (e.g., by video controller 122) to construct a view of local participants 118, 602 and 604 from a direction different from that of any physical camera used by video system 800. The view can appear to originate near the display location of the eyes of the remote participant 112 that has the floor. It is appreciated that the synthesized view can be transmitted to one or more of the remote participants. In various embodiments, other data, such as a three-dimensional reconstruction of the local participants, can be transmitted to remote locations, where this data can be used to construct a video stream of the local participants 118, 602, and 604. As such, the remote participant 112 can have proper eye-contact with local participants 118, 602 and 604 when remote participant 112 has the floor.

Within FIG. 8, when the remote participant of the video stream 120*a* has the floor, video capturing devices 104, 804 and 814 can be selected and activated such that they operate simultaneously to capture different viewpoint video images (or video streams) of the local participants 118, 602 and 604 through display screen 102. The different video images or video streams output by the video capturing devices 104, 804 and 814 can then be utilized (e.g., by video controller 122) to do view synthesis of local participants 118, 602 and 604. The resulting synthesized view can be transmitted to one or more of the remote participants.

Moreover, when the remote participant of the video stream 120*b* has the floor, video capturing devices 108, 808 and 818 can be selected and activated such that they operate simultaneously to capture different viewpoint video images (or video streams) of the local participants 118, 602 and 604 through display screen 102. Note that the different video images or video streams output by the group of video capturing devices 108, 808 and 818 can then be utilized (e.g., by video controller 122) to do view synthesis of local participants 118, 602 and 604. As such, the resulting synthesized view can be transmitted to one or more of the remote participants.

Within FIG. 8, it is understood that in various embodiments, the video system 800 can include more or less video capturing devices than the nine shown. In various embodiments, the video systems 800 can include at least two video capturing devices for each local participant, but is not limited to such.

Figure 9:
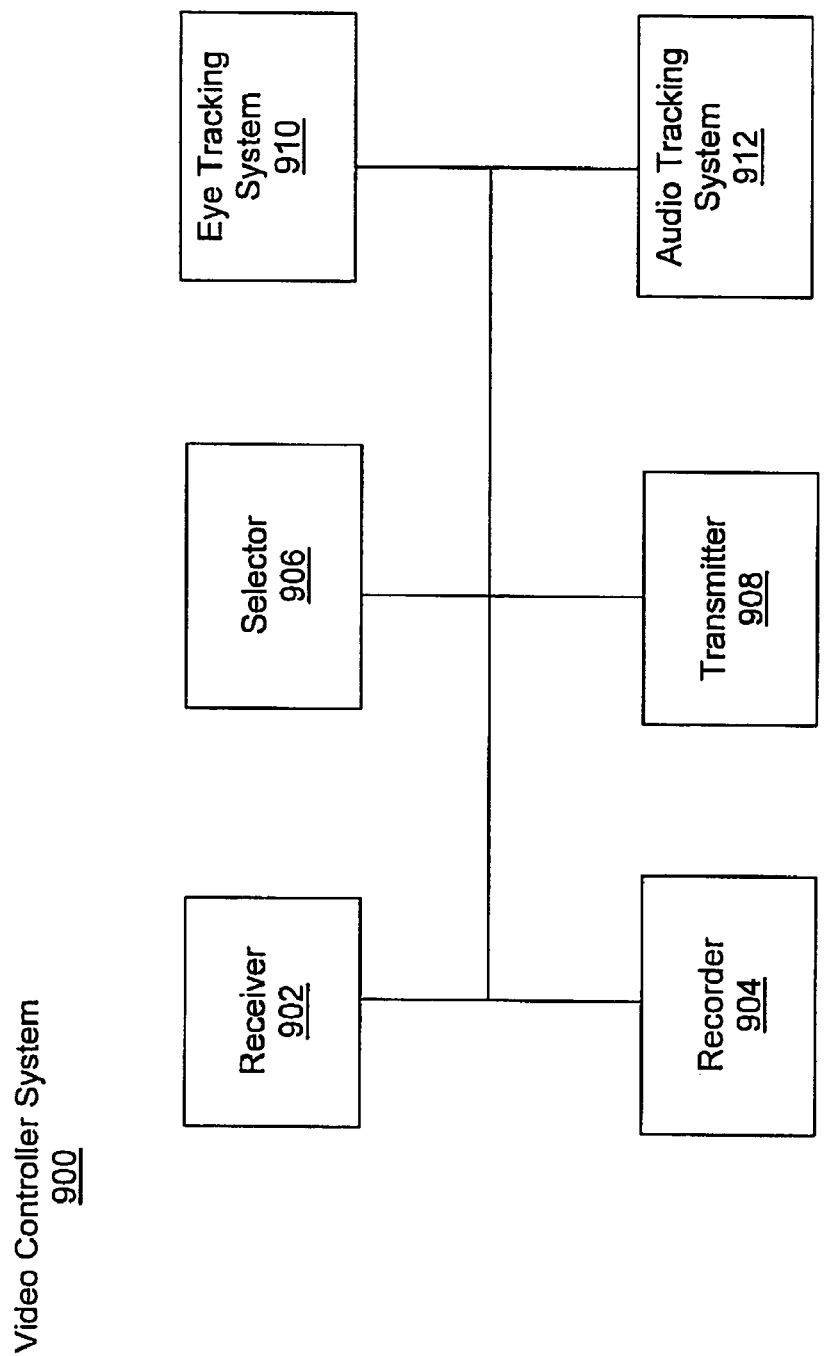
FIG. 9 is a block diagram illustrating an exemplary video controller system in accordance with various embodiments of the invention.

FIG. 9 is a block diagram illustrating an exemplary video controller system 900 in accordance with various embodiments of the invention. It is noted that video controller system 122 of FIG. 1 can be implemented in a manner similar to video controller system 900, but is not limited to such. The video controller system 900 can include, but is not limited to, a receiver 902, a recorder 904, a selector 906, a transmitter 908, a gaze tracking system 910, and an audio tracking system 912, which can each be referred to as a module. Furthermore, it is understood that each of the receiver 902, recorder 904, selector 906, transmitter 908, gaze tracking system 910, and audio tracking system 912 can be implemented with software, firmware, electronic hardware, or any combination thereof. Moreover, each of the receiver 902, recorder 904, selector 906, transmitter 908, gaze tracking system 910, and audio tracking system 912 can be coupled to each other. It is understood that the video controller system 900 can include additional or fewer elements than those shown in FIG. 9.

Within video controller 900, the receiver 902 can be for receiving at least one video stream (or video images) from at least one video capturing device (e.g., 104, 106 and/or 108). Additionally, the receiver 902 can be for receiving at least one audio stream (or sound) from at least one audio capturing device (e.g., 612, 614 and/or 616). Furthermore, the receiver 902 can be for receiving at least one signal from at least one manual mechanism (e.g., 606, 608 and/or 610). The recorder 904 can be coupled to the receiver 902 in order to receive and record (or store) at least one video stream (or video images), at least one audio stream (or sound), and/or at least one signal. It is understood that the recorder 904, in various embodiments, can be implemented with, but is not limited to, volatile memory, non-volatile memory, or any combination thereof. The transmitter 908 can be coupled to the receiver 902 and/or the recorder 904 in order to receive and transmit at least one video stream (or video images).

Within FIG. 9, the gaze tracking system 910 can be coupled to the receiver 902 and/or the recorder 904 in order to receive and analyze at least one video stream (or video images) for the detection, location, and/or movement of any eyes (e.g., of participants). The audio tracking system 910 can be coupled to the receiver 902 and/or the recorder 904 in order to receive and analyze at least one audio stream (or sound) for the detection and/or location of participants. The selector 906 can be coupled to the receiver 902, the recorder 904, the gaze tracking system 910, and/or the audio tracking system 912 for determining and/or selecting which video capturing device to activate or deactivate. It is understood that the video controller 900 can perform any operation or function describe herein with reference to a video controller. Note that the video controller 900 can be implemented as a computing device, but is not limited to such.

It is appreciated that in various embodiments, each of the video systems 100, 100*a*, 100*b*, 500, 600, and 700 can include more or less video capturing devices than the three shown (e.g., video capturing devices 104, 106 and 108). In various embodiments, each of the video systems 100, 100a, 100b, 500, 600, and 700 can include at least two video capturing devices (e.g., 104 and 106), but is not limited to such.

Please note that each of the video systems 100, 100*a*, 100*b*, 500, 600, 700 and 800 can be implemented in any manner similar to the other video systems described herein, but is not limited to such.

Figure 10:
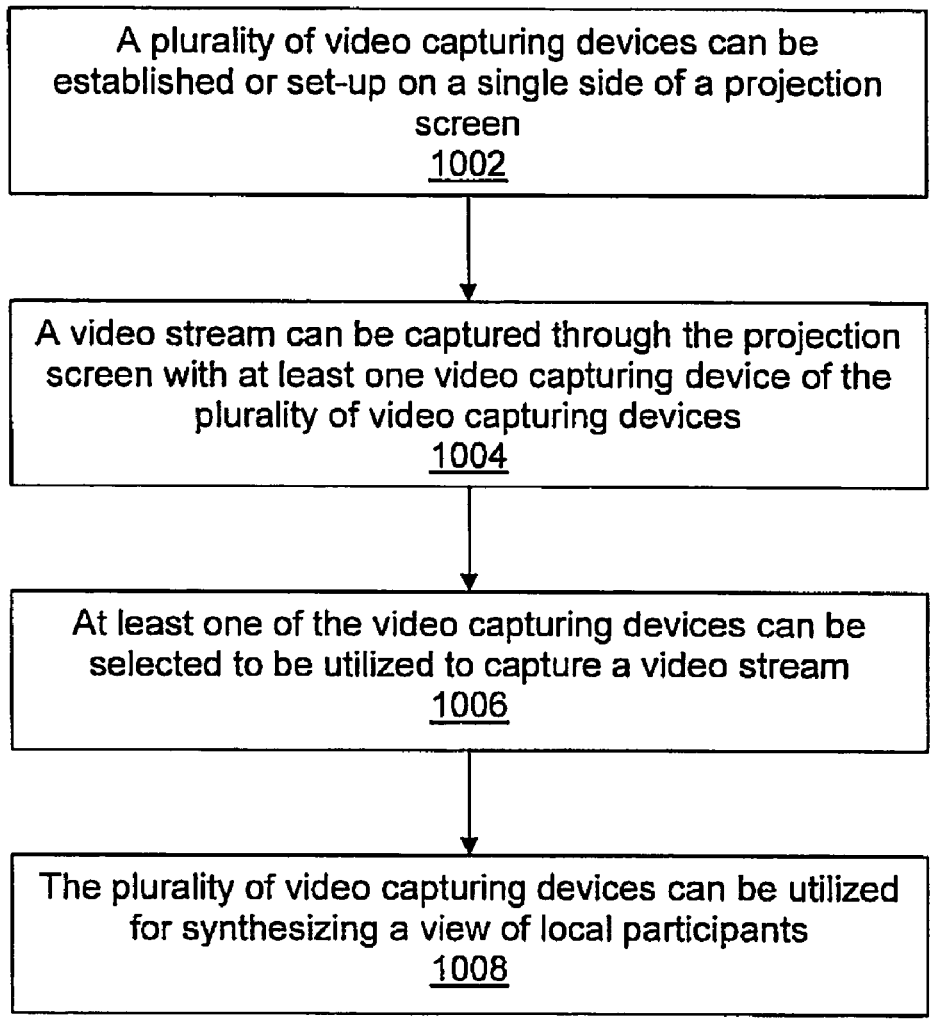
FIG. 10 is a flow diagram of an exemplary method in accordance with various embodiments of the invention.

FIG. 10 is a flow diagram of an exemplary method 1000 for utilizing multiple video capturing devices with a display or projection screen in accordance with various embodiments of the invention. Method 1000 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that can be usable by a computing device. However, the computing device readable and executable instructions (or code) may reside in any type of computing device readable medium. Although specific operations are disclosed in method 1000, such operations are exemplary. Method 1000 may not include all of the operations illustrated by FIG. 10. Also, method 1000 may include various other operations and/or variations of the operations shown by FIG. 10. Likewise, the sequence of the operations of method 1000 can be modified. It is noted that the operations of method 1000 can be performed manually, by software, by firmware, by electronic hardware, or by any combination thereof.

Specifically, a plurality of video capturing devices can be established or set-up on a single side of a projection screen. A video stream can be captured through the projection screen with at least one video capturing device of the plurality of video capturing devices. It is noted that the plurality of video capturing devices can be utilized for three-dimensional reconstruction. Also, the plurality of video capturing devices can be utilized to create a synthetic video stream representing a view from a non-existent video capturing device. At least one of the video capturing devices can be selected to be utilized for capturing a video stream. It is noted that the selection can be based on a wide variety of things. For example in various embodiments, the selection of at least one of the video capturing devices can be based on its horizontal and/or vertical position in relation to the projection screen. Additionally, in various embodiments, the selection of at least one of the video capturing devices can be based on a determination made by a gaze tracking system. Moreover, in various embodiments, the selection of at least one of the video capturing devices can be based on a determination made by an audio tracking system.

At operation 1002 of FIG. 10, a plurality of video capturing devices (e.g., 104, 106 and 108) can be established or set-up on a single side of a projection screen (e.g., 102). Note that operation 1002 can be implemented in a wide variety of ways. For example, operation 1002 can be implemented in any manner similar to that described herein, but is not limited to such.

At operation 1004, a video stream can be captured through the projection screen with at least one video capturing device of the plurality of video capturing devices. It is understood that operation 1004 can be implemented in a wide variety of ways. For example, operation 1004 can be implemented in any manner similar to that described herein, but is not limited to such.

At operation 1006 of FIG. 10, at least one of the video capturing devices can be selected to be utilized to capture a video stream. It is understood that operation 1006 can be implemented in a wide variety of ways. For example in various embodiments, the selection at operation 1006 of at least one of the video capturing devices can be based on its horizontal and/or vertical position in relation to the projection screen. Additionally, in various embodiments, the selection at operation 1006 of at least one of the video capturing devices can be based on a determination made by a gaze tracking system. Moreover, in various embodiments, the selection at operation 1006 of at least one of the video capturing devices can be based on a determination made by an audio tracking system. Furthermore, in various embodiments, the selection at operation 1006 of at least one of the video capturing devices can be based on a determination made by an audio tracking system and a determination made by a gaze tracking system. It is noted that operation 1006 can be implemented in any manner similar to that described herein, but is not limited to such.

At operation 1008 of FIG. 10, the plurality of video capturing devices can be utilized for synthesizing a view of local participants. The view may appear to originate from a location where no physical video capturing device exists. It is appreciated that operation 1006 can be implemented in a wide variety of ways. For example, operation 1006 can be implemented by first performing three-dimensional reconstruction of the scene including the local participants, followed by two-dimensional rendering of the scene from a new camera view direction. Operation 1006 can also be implemented in any manner similar to that described herein, but is not limited to such.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A video system comprising:
a display screen;
a plurality of video capturing devices located behind said display screen, each of said plurality of video capturing devices is for capturing a first video stream through said display screen, wherein said display screen comprises a macroscopically homogenous see-through screen material comprising multiple protrusions that have deposed thereon a black absorber film, wherein a portion of said black absorber film has disposed thereon a reflector film, said reflective film providing a reflective surface for a second video stream output by a projector, and wherein said display screen defines a hole that is aligned with a location of a video capturing device of said plurality of video capturing devices;
a gaze tracking system that is used for selecting a video capturing device of said plurality of video capturing devices; and
a plurality of perforated coverings located to obscure said hole defined by said display screen, wherein said plurality of video capturing devices can capture said first video stream through said plurality of perforated coverings, wherein said plurality of perforated coverings are a similar color as said display screen, wherein said display screen comprises a gray opaque screen surface, and wherein a gray value of said gray opaque screen surface can be adjusted so that said gray value of said gray opaque screen surface matches an average gray value of each of said plurality of perforated coverings.

2. The video system of claim 1, wherein said display screen comprises a transparent substrate.

3. The video system of claim 1, wherein each of said plurality of video capturing devices is located at a different position in relation to said display screen.

4. The video system of claim 1, wherein said plurality of video capturing devices is utilized for view synthesis.

5. The video system of claim 1, further comprising:
an audio tracking system that is used for selecting a video capturing device of said plurality of video capturing devices.

6. A method comprising:
establishing a plurality of video capturing devices on a single side of a projection screen, wherein said projection screen comprises a macroscopically homogenous see-through screen material, comprising multiple protrusions that have deposed thereon a black absorber film, wherein a portion of said black absorber film has disposed thereon a reflector film, and wherein said projection screen defines a hole that is aligned with a location of a video capturing device of said plurality of video capturing devices;
selecting a video capturing device of said plurality of video capturing devices based on a determination by a gaze tracking system or an audio tracking system;
capturing a video stream through said projection screen with said video capturing device of said plurality of video capturing devices; and
obscuring said hole defined by said projection screen with a plurality of perforated coverings, wherein said plurality of video capturing devices can capture said video stream through said plurality of perforated coverings, wherein said plurality of perforated coverings are a similar color as said projection screen, wherein said projection screen comprises a gray opaque screen surface, and wherein a gray value of said gray opaque screen surface can be adjusted so that said gray value of said gray opaque screen surface matches an average gray value of each of said plurality of perforated coverings.

7. The method of claim 6, further comprising:
selecting said video capturing device based on a position of said video capturing device in relation to said projection screen.

8. The method of claim 6, further comprising:
utilizing said plurality of video capturing devices to create a synthetic video stream representing a view from a location where no physical video capturing device exists.

9. The method of claim 6, further comprising:
utilizing said plurality of video capturing devices for three-dimensional reconstruction.

10. The method of claim 6, wherein said projection screen comprises a transparent substrate.

11. A video system comprising:
a projection screen, wherein said projection screen comprises a macroscopically homogenous see-through screen material, comprising multiple protrusions that have deposed thereon a black absorber film;
a view generator for projecting an image onto said projection screen;
a plurality of video capturing devices located behind said projection screen, each of said plurality of video capturing devices is for capturing a video stream through said projection screen using a gaze tracking system that selects a video capturing device of said plurality of video capturing devices, wherein said projection screen defines a hole that is aligned with a location of a video capturing device of said plurality of video capturing devices; and
a plurality of perforated coverings located to obscure said hole defined by said projection screen, wherein said plurality of video capturing devices can capture said video stream through said plurality of perforated coverings, wherein said plurality of perforated coverings are a similar color as said projection screen, wherein said projection screen comprises a gray opaque screen surface, and wherein a gray value of said gray opaque screen surface can be adjusted so that said gray value of said gray opaque screen surface matches an average gray value of each of said plurality of perforated coverings.

12. The video system of claim 11, wherein each of said plurality of video capturing devices is located at a different position in relation to said projection screen.

13. The video system of claim 11, wherein said projection screen is transparent.

14. The video system of claim 11, further comprising:
a controller coupled with said plurality of video capturing devices and said controller is for selecting which video capturing device of said plurality of video capturing devices is active.

15. The video system of claim 11, wherein said plurality of video capturing devices is utilized for view synthesis.

* * * * *